Figure 1:
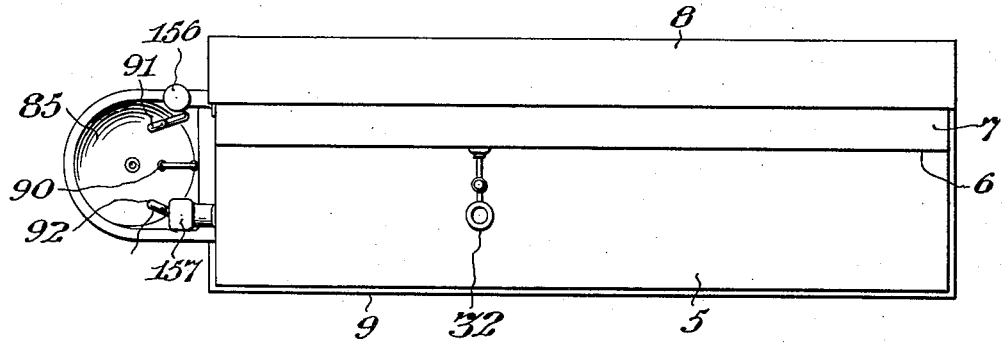

Sept. 10, 1940.  R. C. ANGELL  2,214,316

DENTAL EQUIPMENT ASSEMBLAGE

Filed April 5, 1938  6 Sheets-Sheet 1

INVENTOR
Robert C. Angell,
BY
ATTORNEY

Sept. 10, 1940.    R. C. ANGELL    2,214,316
DENTAL EQUIPMENT ASSEMBLAGE
Filed April 5, 1938    6 Sheets-Sheet 2

INVENTOR
Robert C. Angell,
BY
Clifton C. Hallowell
ATTORNEY

Sept. 10, 1940.  R. C. ANGELL  2,214,316
DENTAL EQUIPMENT ASSEMBLAGE
Filed April 5, 1938  6 Sheets-Sheet 3
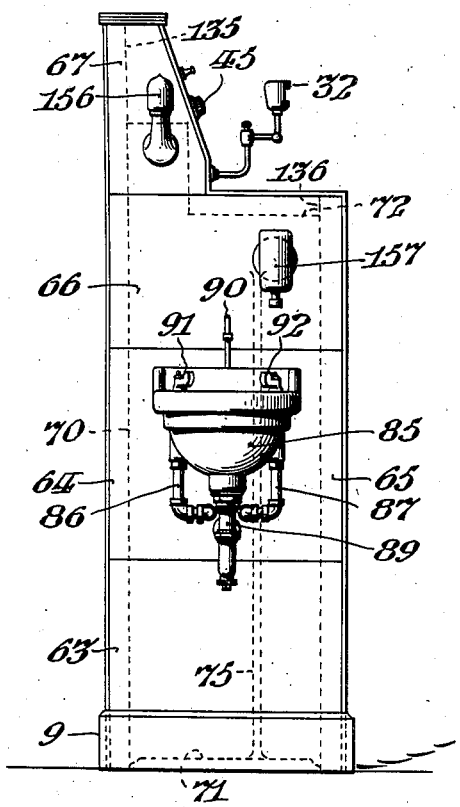
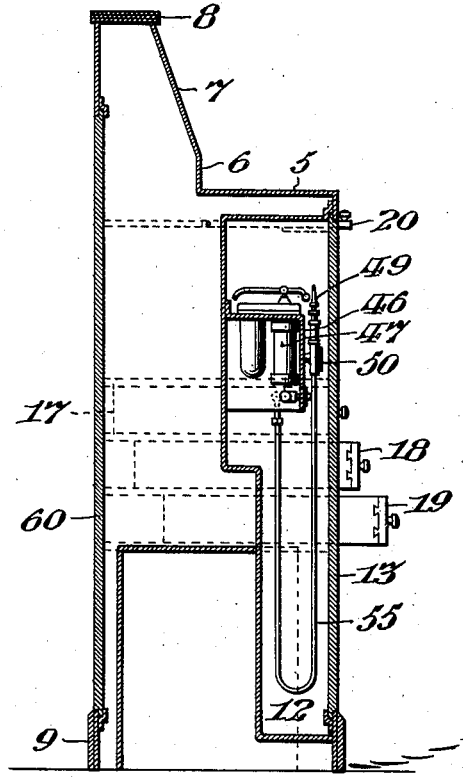
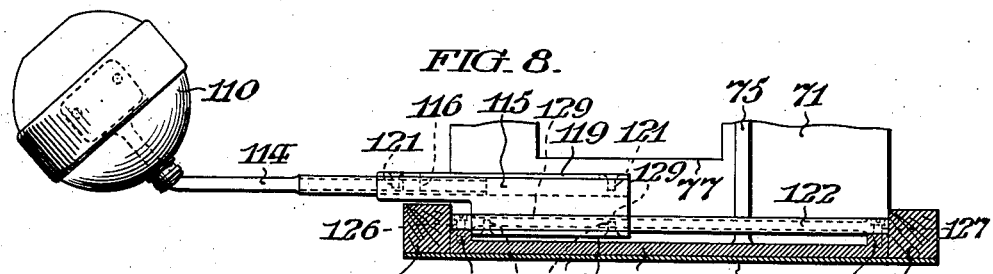
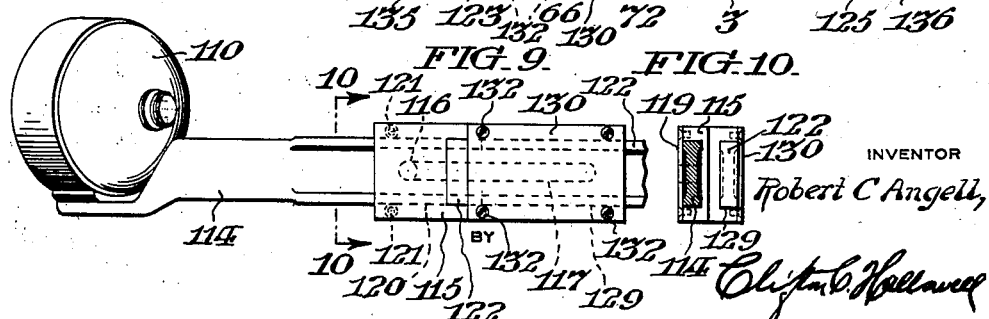
INVENTOR
Robert C Angell,
BY
ATTORNEY

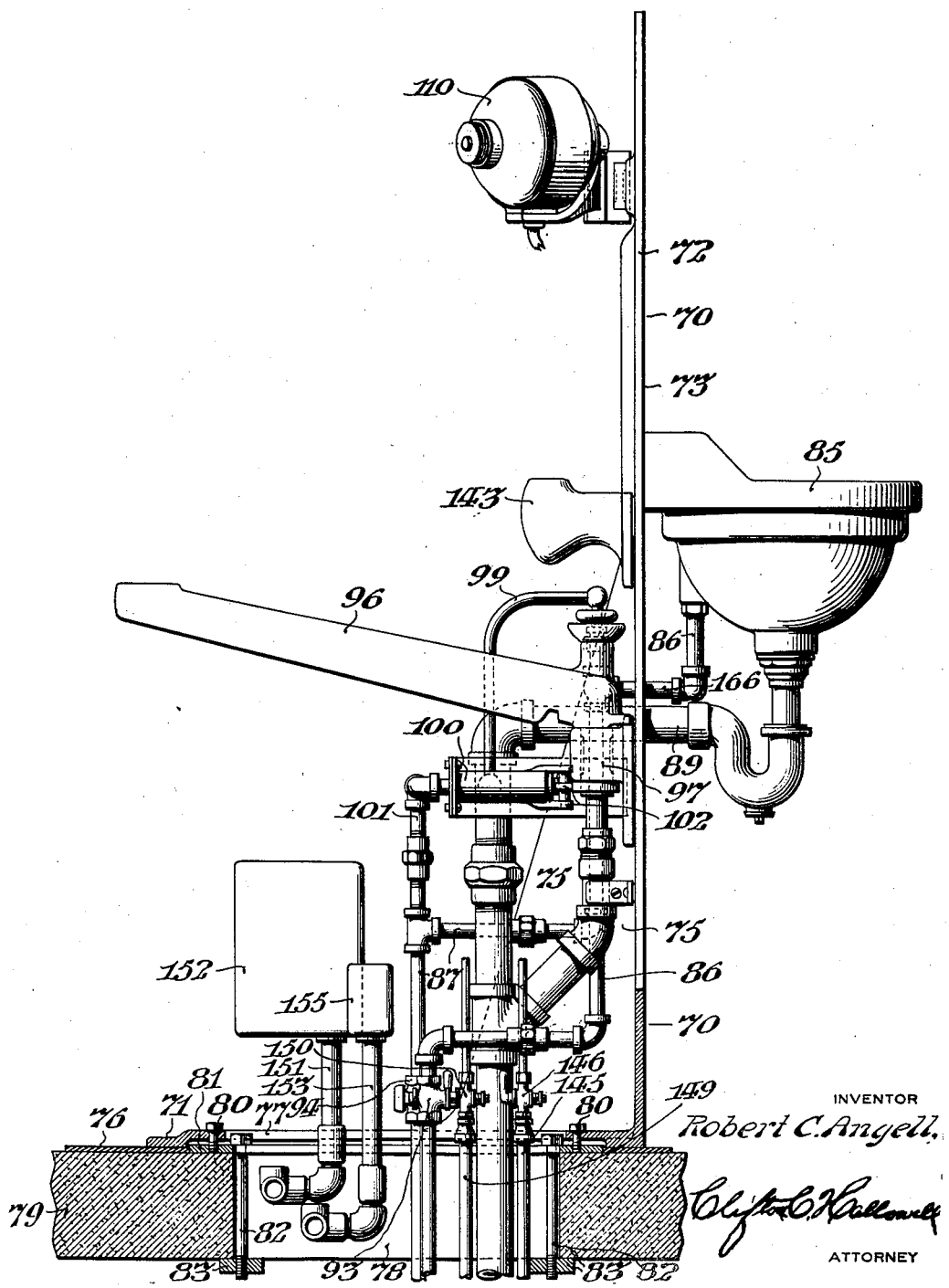

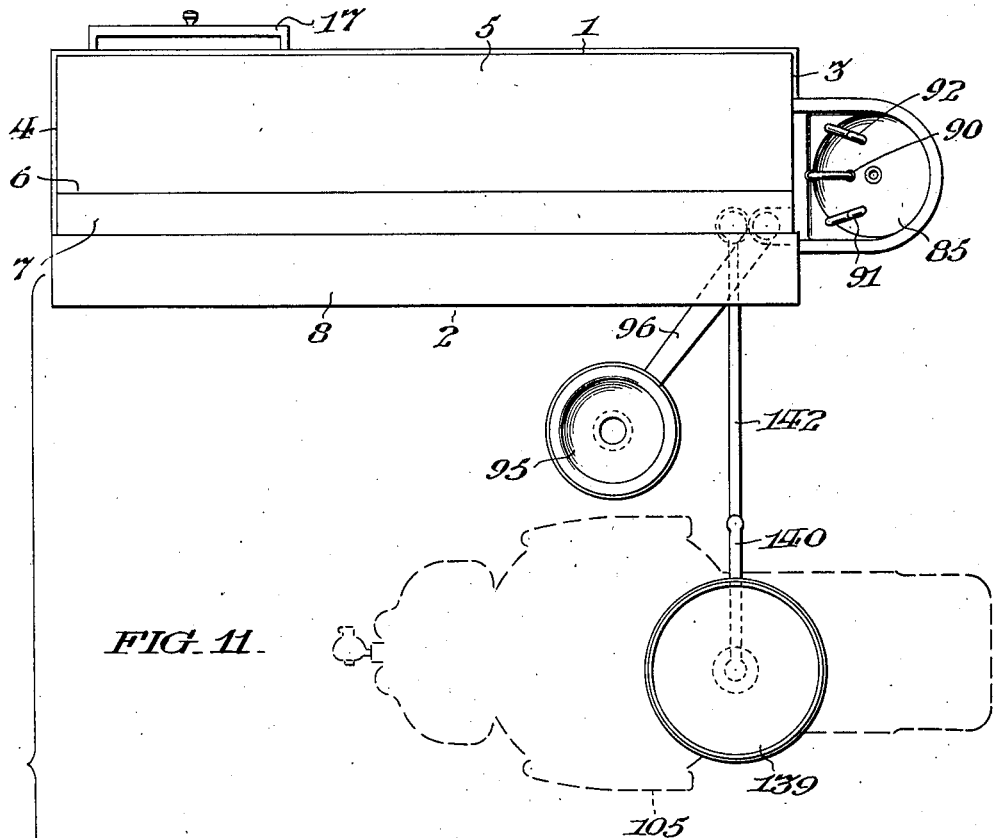
FIG. 11.
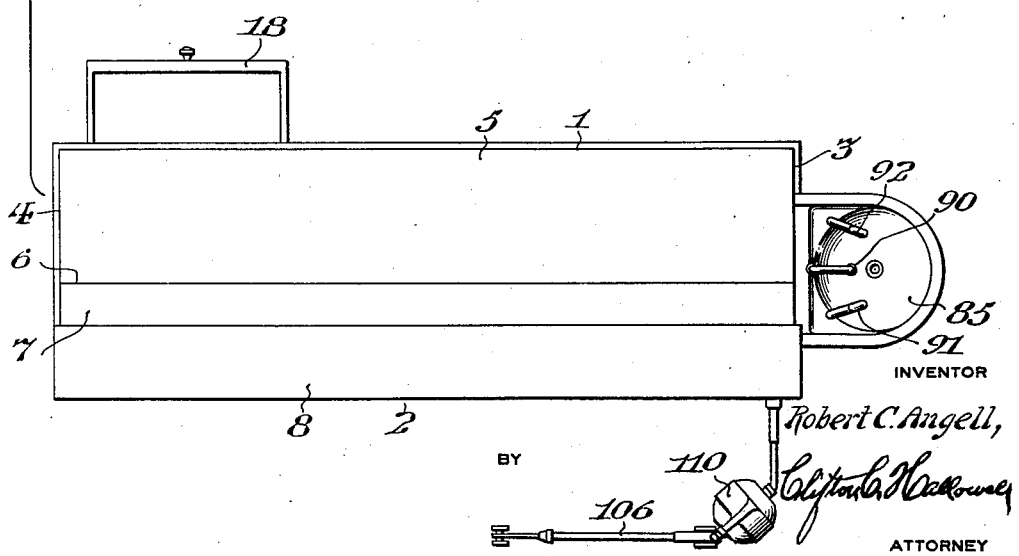

Sept. 10, 1940.　　　　R. C. ANGELL　　　　2,214,316
DENTAL EQUIPMENT ASSEMBLAGE
Filed April 5, 1938　　　　6 Sheets-Sheet 6

INVENTOR
Robert C. Angell,
BY
ATTORNEY

Patented Sept. 10, 1940

2,214,316

UNITED STATES PATENT OFFICE 2,214,316

DENTAL EQUIPMENT ASSEMBLAGE

Robert C. Angell, Prince Bay, N. Y., assignor to The S. S. White Dental Manufacturing Company, a corporation of Pennsylvania Application April 5, 1938, Serial No. 200,144

9 Claims. (Cl. 32—23)

My invention relates particularly to that class of dental furniture that may be equipped with those devices and appurtenances that a dental practitioner employs in the practice of his profession and that may occupy a position in close approximation to a dental operating chair so as to be readily accessible to the operator and easily conveyed to the patient in the chair.

The principal objects of my invention are to provide a cabinet that may be closed and locked and within which all of the operating appliances may be housed when not in use, to provide an equipment mounting standard that serves to so support said operating appliances as to permit their withdrawal from the cabinet into convenient position with respect to the patient in the chair, and also serves as a reinforcing support for the cabinet structure within the walls of which it is enveloped.

Other objects of my invention are to provide a supporting standard that may be easily set up and attached to the floor and having means for the convenient attachment of the operating appliances and the necessary electrical and fluid connections thereto, and which readily lends itself to the subsequent application of the cabinet structure thereto which may conveniently envelop the operating structure thus assembled with freedom of access.

Further objects of my invention are to provide a cabinet with walls having openings suitably located therein through which the various operating appliances and devices may extend when projected outwardly to a position convenient for use, and having suitable closures for protecting said appliances and devices within the cabinet walls when in retracted position and not in use.

My invention comprehends an equipment cabinet particularly adapted for use in battery assemblage such as may be conveniently employed in institutions of learning or in offices wherein several operators may have chairs disposed between adjacent cabinets and utilize the equipment devices conveniently disposed in the opposing sides of the relatively adjacent cabinets.

My invention also includes all of the various novel features of construction and arrangement as hereinafter more definitely specified.

Figure 2:
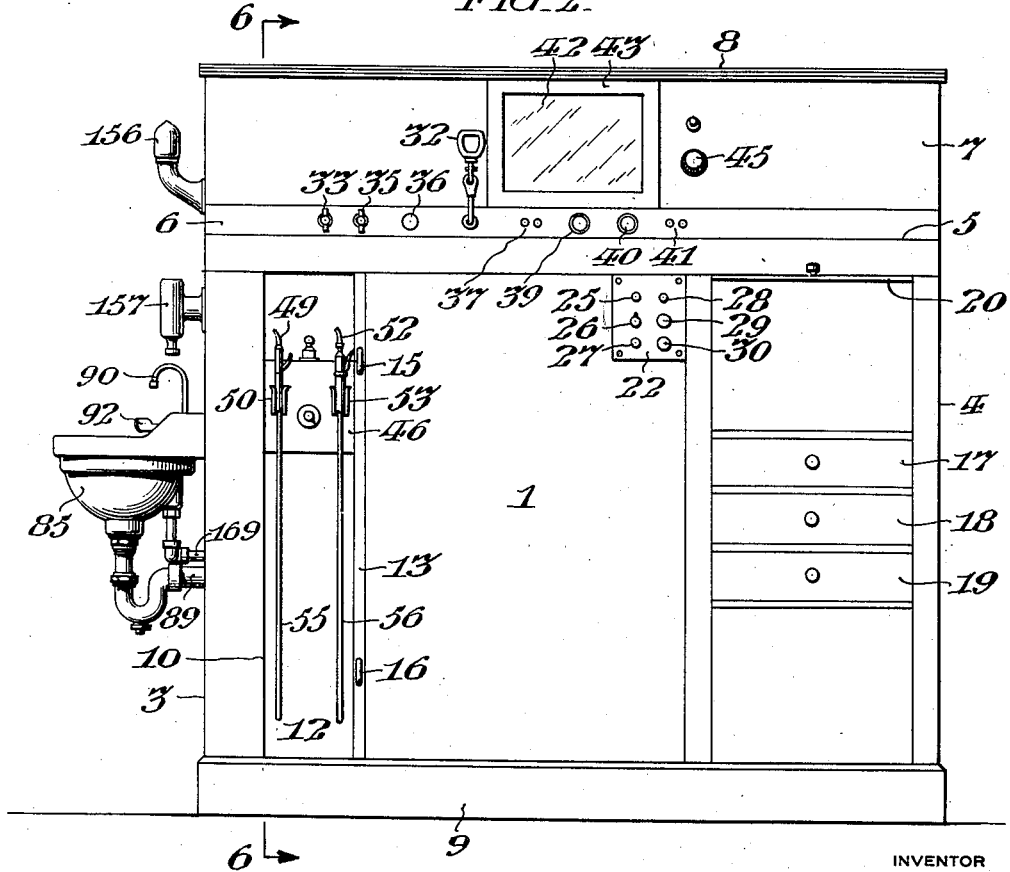
Figure 3:
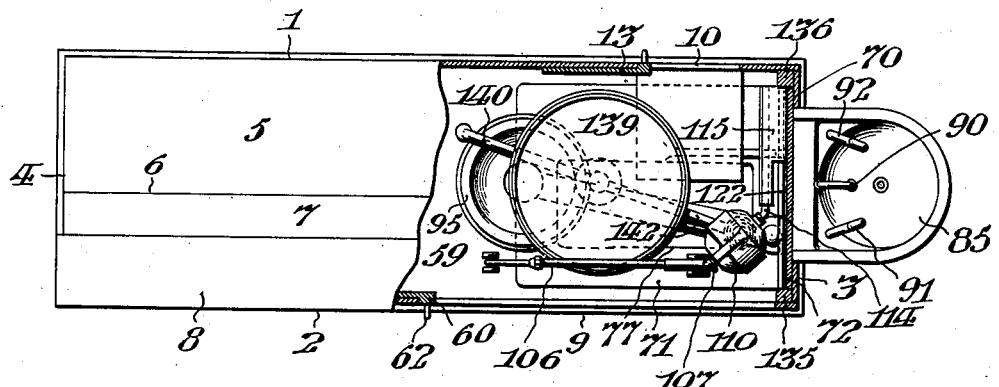
Figure 4:
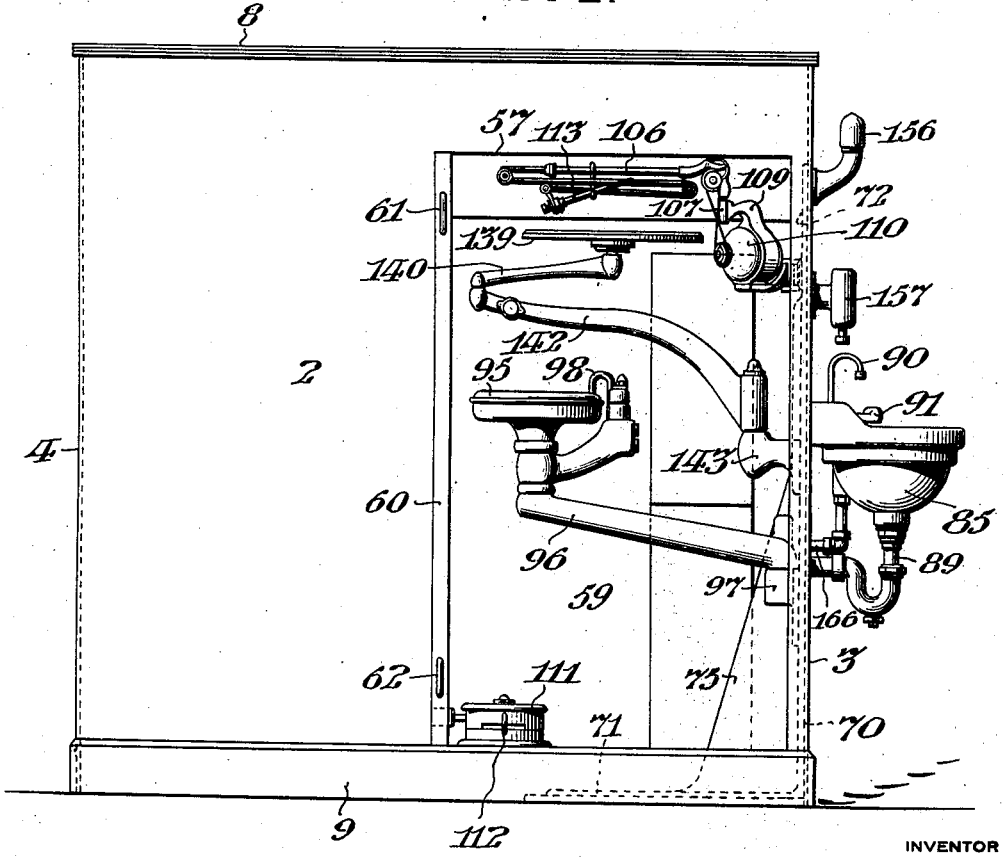
Figure 12:
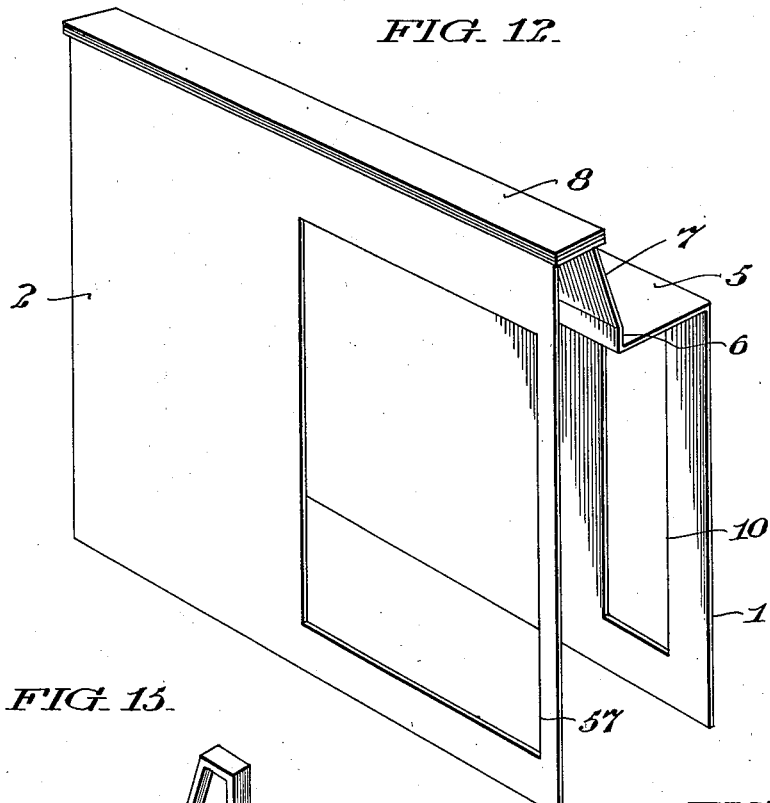
Figure 15:
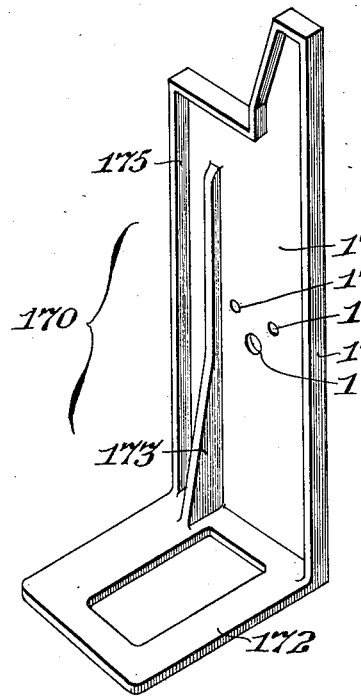
Figures 13, 14:
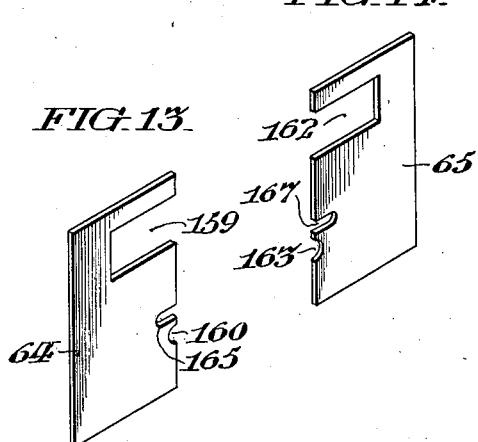

In the accompanying drawings, Figure 1 is a plan view of an equipment cabinet constructed in accordance with my invention; Fig. 2 is an elevational view of the cabinet as viewed from the front of the cabinet depicted in Fig. 1; Fig. 3 is a plan sectional view of said cabinet shown in a position reversed from that shown in Fig. 1 and having the upper part of the basin end of the cabinet broken away and shown in section to reveal the various enclosed appliances and their supporting standard; Fig. 4 is an elevational view of the cabinet as viewed from side of the cabinet opposite that shown in Fig. 2 and the side toward the observer in Fig. 3; Fig. 5 is an end view of the cabinet as viewed from the left end of Figs. 1 and 2 and from the right end of Figs. 3 and 4; Fig. 6 is a sectional view taken through the cabinet on the line 6—6 in Fig. 2, certain parts in the plane of section being omitted for convenience of illustration; Fig. 7 is a sectional elevation of the bracket-like supporting standard with the various appliances attached thereto and assembled in operative relation prior to positioning and attaching thereto the housing, comprising the cabinet structure including its walls; Fig. 8 is a plan sectional view of the engine motor mounting and supporting standard with a fragmentary section of the cabinet structure including the corner stiles and end wall attached; Fig. 9 is a side elevational view of the engine motor mounting; Fig. 10 is a transverse sectional view of said engine motor mounting taken on the line 10—10 in Fig. 9; Fig. 11 illustrates diagrammatically two of the cabinets assembled in battery formation in relation to an interposed operating chair; Fig. 12 is a perspective view of open ended cabinet structure arranged to be shifted into engagement with the supporting standard, upon which the supported appliances have been mounted, and to which said open ended cabinet structure may be conveniently attached and the cabinet end applied to complete the equipment cabinet, ready for use; Fig. 13 is a perspective view of the right hand half of the end wall section adjacent to the basin as shown in Fig. 5; Fig. 14 is a perspective view of the right hand half of the end wall section adjacent to the basin as shown in Fig. 5 and being complementary to the end wall section shown in Fig. 13 to form the medial section of the end wall of the main body of the cabinet structure; and Fig. 15 is a perspective view of a modified form of the supporting unit illustrated in Fig. 7.

In said figures, the equipment cabinet comprises the front wall 1, rear wall 2, end walls 3 and 4, shelf 5, the switch-board panel 6 and the inclined panel 7, top cover 8 and base-board 9.

The front wall 1 is provided with the opening 10, affording access to the chamber 12 and provided with the slidable closure 13 having the hand-holds 15 and 16, the drawers 17, 18, 19, and the slide or drawout table 20, which serves also as a closure for the chamber 21. Said wall 1 also includes the control panel 22, having the control knobs 25, 26, 27, 28, 29 and 30 for the control of the low voltage switch, air pressure valve, warm air syringe valve, low voltage control, cautery and pulp tester control and mouth lamp control respectively, all being of well known construction and not specifically illustrated.

The switch-board panel 6, which connects the shelf 5 with the inclined panel 7, has mounted thereon the gas burner 32 and is provided with the air cock 33, gas cock 35, line voltage outlet 36, master switch 37, red pilot light 39, white signal light 40, and the signal switch 41, the functions of which are well known in the art and consequently are not herein described in detail.

The inclined panel 7, which extends between the switch-board panel 6 and the top cover 8 is provided with the X-ray film viewing compartment window 42 having the frame 43, and carries the illumination control switch knob 45 for turning on and off the lamp, not shown, but which is adapted to illuminate said X-ray film viewing compartment, and to light up the window 42.

Within the chamber 12 a suitably provided bracket 46 is provided upon which is supported the spray bottle 47, the air cut-off 49 removably supported in the holder 50, and the warm air syringe 52 removably supported in the holder 53. Said air cut-off 49 being connected with a source of air by the flexible tubing 55 and the warm air syringe 52 being connected with the source of air supply by the flexible tubing 56, it is obvious that both said cut-off 49 and syringe 52 can be moved to any desired position within the range of the length of said flexible tubing.

The rear wall 2 of the cabinet is provided with the opening 57, affording access to the chamber 59, and provided with the slidable closure 60, having the handholds 61 and 62 by which it may be moved toward the right as shown in Fig. 4, to close the chamber 59 or moved toward the left to the position shown in said figure to open said chamber.

The front wall 1 and rear wall 2 are conveniently joined together in integral relation by the end wall 4, shelf 5, switch-board panel 6, the inclined panel 7 and the top cover 8 to form an open ended cabinet structure, as shown in Fig. 12, which is arranged to be subsequently closed by the end wall 3 comprising the several separately assembled sections 63, 64, 65, 66 and 67 as hereinafter more definitely described.

The equipment mounting standard 70, as best shown in Fig. 7, is in the form of a supporting and reinforcing bracket and comprises the horizontal base 71, and the vertical upright in the form of a standard plate 72 having its outer plane surface 73 coincident with the end wall 3, said base and standard being rigidly connected by the transversely extending stiffening rib 75.

As shown in Fig. 7, the base 71 rests upon the floor covering 76 such as linoleum, and is provided with an opening 77 which is arranged to substantially register with a similar opening 78 in the floor 79 which, as shown, is composed of concrete, but may be of any other suitable material employed in building construction. Said base is attached by the screws 80 to the floor plate 81, which in turn is attached by the bolts 82 to the tie-bars 83 disposed beneath the floor 79, and which is rigidly held engaged with relation to said floor.

As best shown in Fig. 7, the equipment mounting standard may be first erected and secured to the floor 79 and the various equipment appliances and devices may be mounted thereon and the connections made independent of the enclosing or enveloping cabinet structure, thereby greatly facilitating the assemblage of the integral parts to form the equipment unit about which the cabinet structure may be subsequently assembled.

Referring again to Fig. 7, the wash-basin 85 is attached to and supported by the vertical standard plate 72, and has its hot and cold water supply pipes 86 and 87 respectively extending through said standard 72 and downwardly through the openings 77 and 78 in the base 71 and floor 79 respectively, to their sources of supply.

Similarly, the waste water pipe 89 is extended through said standard 72 and said openings 77 and 78 to a proper waste outlet such as a sewer. As shown in Figs. 3, 4 and 5, the water from the pipes 86 and 87 is directed into the basin 85 through the goose-neck faucet 90 and the hot and cold water supply is controlled at said basin 85 by the valve levers or handles 91 and 92. The water supply may also be controlled by the valves 93 and 94 respectively included in said hot and cold water supply pipes 86 and 87 within the cabinet closure.

The spittoon 95, shown in Figs. 3 and 4, is mounted on the swingable arm 96, which, as best shown in Fig. 7, is pivoted to swing horizontally on the bracket 97. Water is supplied to the spittoon through the goose-neck faucet 98 which is connected by suitable piping extending through the arm 96 with the conveyer pipe 99 in a well known manner, said water being controlled by the automatic shut-off valve 100 which connects the conveyor pipe 99 with the cold water supply pipe 87 through the branch pipe connection 101.

By mechanism 102, of well known construction, the swinging outwardly of the spittoon 95 on the bracket 97 to its operative position with respect to the operating chair 105, see Fig. 13, water is permitted, by reason of the automatic actuation of the valve 100, to pass through the valve 100, the pipe 99 and the goose-neck faucet 98 into the spittoon 95; however, movement of said spittoon back into its inoperative position in the cabinet automatically actuates said valve 100 to shut off the water supply to said faucet 98, so that no water can flow into the spittoon when it is not in proper position for use.

The electric engine 106 illustrated is the cord driven type and is mounted to swing into various operative positions in proximity to the chair 105. Said electric engine 106 is pivoted at 107 to the free end of the bracket 109 which projects from the electric motor 110, thus permitting said engine to swing horizontally as a whole, the several arms of which are capable of permitting the driven tool, such as the hand-piece 113 to assume a universal range of movement, as is well known in the art.

The motor 110 is mounted for lineal adjustment into and out of the cabinet whereby it may be extended, as shown in Figs. 8 and 9, free of the cabinet as indicated in Fig. 11. It will be observed by reference to Figs. 8 and 9 that the motor 110 is supported on an extensible arm 114 which is slidably mounted in the slide-block 115 and limited in its lineal movement by the stop pin 116 projecting from said arm 114 into the slot 117 in the cover plate 119 which retains said arm 114 in the guiding groove 120 in which it is arranged to slide, the cover plate 119 being secured to the slide-block 115 by the screws 121.

The range of lineal movement of the motor 110 and the engine pivotally supported thereby is greatly increased by reason of thhe fact that the slide-block 115 is mounted for further linear movement on the slide-bar 122 which is mounted on suitably provided bosses 123 and 125 projecting inwardly from the inner surface of the vertically disposed standard plate 72, and said slide-bar 122 is secured to said plate by the screws 126 and 127, as shown in Fig. 8.

The slide-bar 122 slidably extends through the groove 129 in the slide-block 115 and is slidably retained therein by the cover plate 130 which is secured to said slide-block 115 by the screws 132.

By the arrangement thus described it will be seen, upon inspection of Fig. 8, that the slide-block 115 has a range of movement substantially limited only by the bosses 123 and 125 adjacent the corner stiles 135 and 136 of the cabinet structure to which the end wall 3 is attached, thus permitting the motor 110 with its engine 106, to be projected well beyond the wall 2 of the cabinet, as illustrated in Fig. 11. The motor 110 is conveniently connected in a well known manner to be controlled by the foot operated controller 111 having the operating lever 112.

The bracket table 139 is pivotally mounted on the jointed outer extension 140 of the bracket table arm 142 which is pivoted to swing about a vertical axis on bracket 143. Said bracket is secured to the standard plate 72 and projects inwardly therefrom above the bracket 97 that swingably supports the arm 96 of the spittoon 95.

As best illustrated in Fig. 7, the opening 77 in the base 71 conveniently affords entrance into the cabinet of the gas pipe 145 having the controlling valve 146, and the air pipe 149 having the controlling valve 150, and also affords entrance of the electrical conduit 151 leading to the high voltage receptacle 152 and the electrical conduit 153 leading to the low voltage receptacle 155.

As shown in Figs. 1, 2, 4 and 5, the lamp 156 and the soap dispenser 157 are supported by the standard plate 72 and project outwardly from the end wall 3 of the cabinet in suitably disposed relation above the wash basin 85 to afford illumination and cleansing material when required.

As shown in Fig. 5, the end wall 3 is composed of the assembled wall sections 63, 64, 65, 66 and 67, and, as best illustrated in Figs. 13 and 14, the wall sections 64 and 65 are formed to embrace the wash-basin 85 and the waste water pipe 89, the section 64 having the rectangular recess 159 arranged to receive the wash-basin 85 and the semi-circular recess 160 arranged to receive the waste water pipe 89, and the section 65 having the rectangular recess 162 arranged to receive the wash-basin 85 and the semi-circular recess 163 arranged to receive the waste water pipe 89.

The wall section 64 is also provided with the aperture 165 through which the nipple section 166 of the hot water supply pipe 86 extends, and the wall section 65 is also provided with the aperture 167 through which the nipple section 169 of the cold water supply pipe 87 extends.

Said end wall sections 63, 64, 65, 66 and 67 may be conveniently attached to the standard plate 72 or to the corner stiles 135 and 136 of the cabinet structure or to both as may be deemed advisable, to form the end wall 3.

In the form of my invention illustrated in Fig. 15, the standard plate 171 of the standard 170 rises from the base 172 being connected therewith by the rib 173, and having the perimetral flange 175 conforming to the internal outline of the open end margin of the cabinet structure shown in Fig. 12.

My invention is particularly advantageous in that the standard 70 may be set up and its base 71 attached to the floor, and the various operative appliances, apparatus and devices employed by the operator mounted thereon without inconvenience, as illustrated in Fig. 7, after which the assembled open ended cabinet structure such as illustrated in Fig. 12 may be pushed into position to envelop said appliances, apparatus and devices as are to be enclosed. The cabinet thus positioned may then be securely attached to said standard 70 by means of the corner stiles 135 and 136 and the end sections 63, 64, 65, 66, and 67 which are assembled to complete the end wall 3, as shown in Figs. 3 and 5.

It will be obvious from an inspection of Figs. 12 and 15 that after the various operative appliances, apparatus and devices, as shown in Fig. 7, have been mounted upon the standard 170, shown in Fig. 15, the open ended cabinet structure shown in Fig. 12 may be pushed into such position that the free margins of the walls 1 and 2, the shelf 5, inclined panel 7, and top cover 8 so overlap the perimetral flange 175 as to permit said margins to be directly attached to said flange 175. In this form of my invention, the standard plate 171 may if desired serve as the end wall of the cabinet without the further application of complementary end wall sections, such as illustrated in Fig. 5.

The cabinet structure thus constructed and assembled not only affords convenience in assembling, repairing and replacing of the various apparatus, appliances and devices employed by the operator, but it provides a cabinet structure that is so braced and supported by the supporting standard to which it is removably attached as to afford a rigid envelop, for the parts to be enclosed, that may be formed of relatively light material.

The dental equipment assemblage herein depicted is particularly applicable in use in colleges or large dental offices where a number of operators are employed, and wherein a number of the equipment assemblages may be arranged in battery formation, as shown in Fig. 11, an operator being posed in the position between two adjacent assemblages, and in convenient position to easily withdraw from the opposed sides of said assemblages the apparatus, appliances and devices which he desires to employ.

I do not desire to limit my invention to the precise details of construction and arrangement as herein set forth, as it is obvious that various modifications may be made therein without departing from the essential features of my invention as defined in the appended claims.

Having thus described my invention, I claim:
1. A dental equipment assemblage comprising a cabinet structure and a bracket-like supporting standard having a base and a substantially flat upright, a wash-basin rigidly attached to the outer side of said upright, a cuspidor mounted to swing on a pivoted support attached to the inner side of said upright, the cabinet structure including the walls having apertures therein being engaged with said standard and rigidly supported thereby, said wash-basin being permanently disposed without the cabinet while the cuspidor is normally housed within said cabinet but capable of being projected through one of said apertures and disposed exterior to said cabinet in a convenient position for use.

2. A dental equipment assemblage comprising a cabinet structure and a bracket-like supporting standard having a base and a substantially flat upright, a wash-basin rigidly attached to the outer side of said upright, a cuspidor mounted to swing on a pivoted support attached to the inner side of said upright, means arranged to support a tool driving mechanism including an electric motor mounted on a lineally movable support attached to the inner side of said upright, the cabinet structure including walls having closable openings therein being engaged with said standard and rigidly supported thereby, said washbasin being permanently disposed without the cabinet and projecting outwardly therefrom while the cuspidor and tool driving mechanism are normally housed within said cabinet but capable of being projected through one of said openings and disposed exterior to said cabinet in a position convenient for use, and closures for said openings.

3. A dental equipment assemblage comprising a cabinet structure and a bracket-like supporting standard having a base and a substantially flat upright, a wash-basin rigidly attached to the outer side of said upright, a cuspidor mounted to be moved toward and from said standard on a movable carrier attached to the inner side of said upright, water supply and waste connections disposed adjacent the inner side of said upright and connected with said cuspidor and extensions thereof connected through said upright with said wash-basin, the cabinet structure including walls having suitably provided access openings being connected with said standard to house the equipment unit assembly thus described with the wash-basin and its water and waste connections projecting permanently from the housing thus assembled about said unit, said cuspidor being capable of movement through one of said openings.

4. A dental equipment assemblage, comprising a separately assembled equipment supporting unit having a base arranged to be attached to a floor, and a standard having oppositely directed substantially flat faces, operative appliances mounted on said standard and respectively projecting from said faces, certain of said appliances being capable of lateral adjustment, and a separately assembled open ended cabinet structure attached to said standard which serves as a closure for its open end and as a brace for said cabinet structure, certain of said operative appliances being embraced by said cabinet structure but arranged to be projected through a suitably provided opening in its side wall.

5. A dental equipment assemblage, comprising a separately assembled equipment supporting unit having a base arranged to be attached to a floor, and a standard having oppositely directed substantially flat faces, operative appliances including a wash-basin mounted on said standard and respectively projecting from said faces, a separately assembled open ended cabinet structure so attached to said standard that it extends across the open end, and a plurality of end sections formed of sheet material extending across said open end and serving to secure said cabinet structure to said standard.

6. A dental equipment assemblage, comprising a separately assembled equipment supporting unit having a base arranged to be attached to a floor, and a standard having oppositely directed substantially flat faces, operative appliances including a wash-basin mounted on said standard and respectively projecting from said faces, a separately assembled open ended cabinet structure so attached to said standard that it extends across the open end, and an end wall embracing said wash-basin and comprising a plurality of suitably formed sections of sheet material serving to secure said cabinet structure to said standard.

7. A dental equipment assemblage comprising a separately assembled equipment supporting unit having a base arranged to rest upon a floor and a standard having oppositely directed faces, operative appliances mounted on said standard and respectively projecting from said faces, certain of said appliances being stationary therewith while others are capable of lateral adjustment with respect to said standard, and a separately assembled open ended cabinet structure arranged to be moved into and out of contact with said standard and to be attached to said standard which serves as a closure for its open end and a stabilizing medium for said cabinet structure, the operative appliances thus housed by the cabinet structure being arranged to be projected through a suitably provided opening in its said side wall.

8. A dental equipment assemblage comprising a cabinet structure and a bracket-like supporting standard having a base and an upright, a wash-basin rigidly attached to the outer side of said upright, a cuspidor mounted on the inner side of said upright and arranged to be moved with respect thereto while being supported thereby, the cabinet structure including walls having apertures therein and being integrally joined together to form a housing arranged to inclose said cuspidor, said housing structure being movable toward and away from said standard and arranged to be rigidly attached thereto, said washbasin being disposed without the cabinet while the cuspidor is normally housed within said cabinet but capable of being projected through one of said apertures into a convenient position for use.

9. A dental equipment assemblage comprising a separately assembled equipment supporting unit having a base and a standard in the form of a flanged plate and including operative apparatus mounted thereon and projecting from the opposite faces thereof, and a separately assembled open-ended cabinet structure comprising relatively integral front, back and end walls removable and replaceable as a unitary structure and arranged to be attached to said standard in relatively removable relation cooperative therewith to house the operative apparatus projecting from the innermost of said faces.

ROBERT C. ANGELL.